United States Patent [19]
Majkrzak

[11] 3,943,884
[45] Mar. 16, 1976

[54] FLUIDIC FREQUENCY GENERATOR
[76] Inventor: Charles Peter Majkrzak, 34 Roosevelt St., Nutley, N.J. 07110
[22] Filed: Jan. 21, 1974
[21] Appl. No.: 435,362

[52] U.S. Cl......... 116/137 R; 73/194 A; 116/137 A
[51] Int. Cl.² ........................................... G01F 1/66
[58] Field of Search..... 116/137 A, 137 R; 138/122; 73/339 A, 24, 30, 194 A, 194 B, 194 C

[56] References Cited
UNITED STATES PATENTS
2,720,221  10/1955  Neilson .............................. 138/122
2,986,169  5/1961  McCormick ........................ 138/122

*Primary Examiner*—S. Clement Swisher
*Assistant Examiner*—Denis E. Corr

[57] ABSTRACT

A helix of wire having predetermined dimensions is encircled by a sleeve of selected material which conforms to the exterior surface configuration of the helix. When a gas is applied into one end of the helix-sleeve combination, an audio frequency signal appears at the other end of the helix-sleeve combination having a frequency which increases in steps proportional to the entrance pressure of the gas flowing through the helix-sleeve combination, or proportional the changes in the mass rate of flow of the gas through the helix-sleeve combination.

9 Claims, 4 Drawing Figures

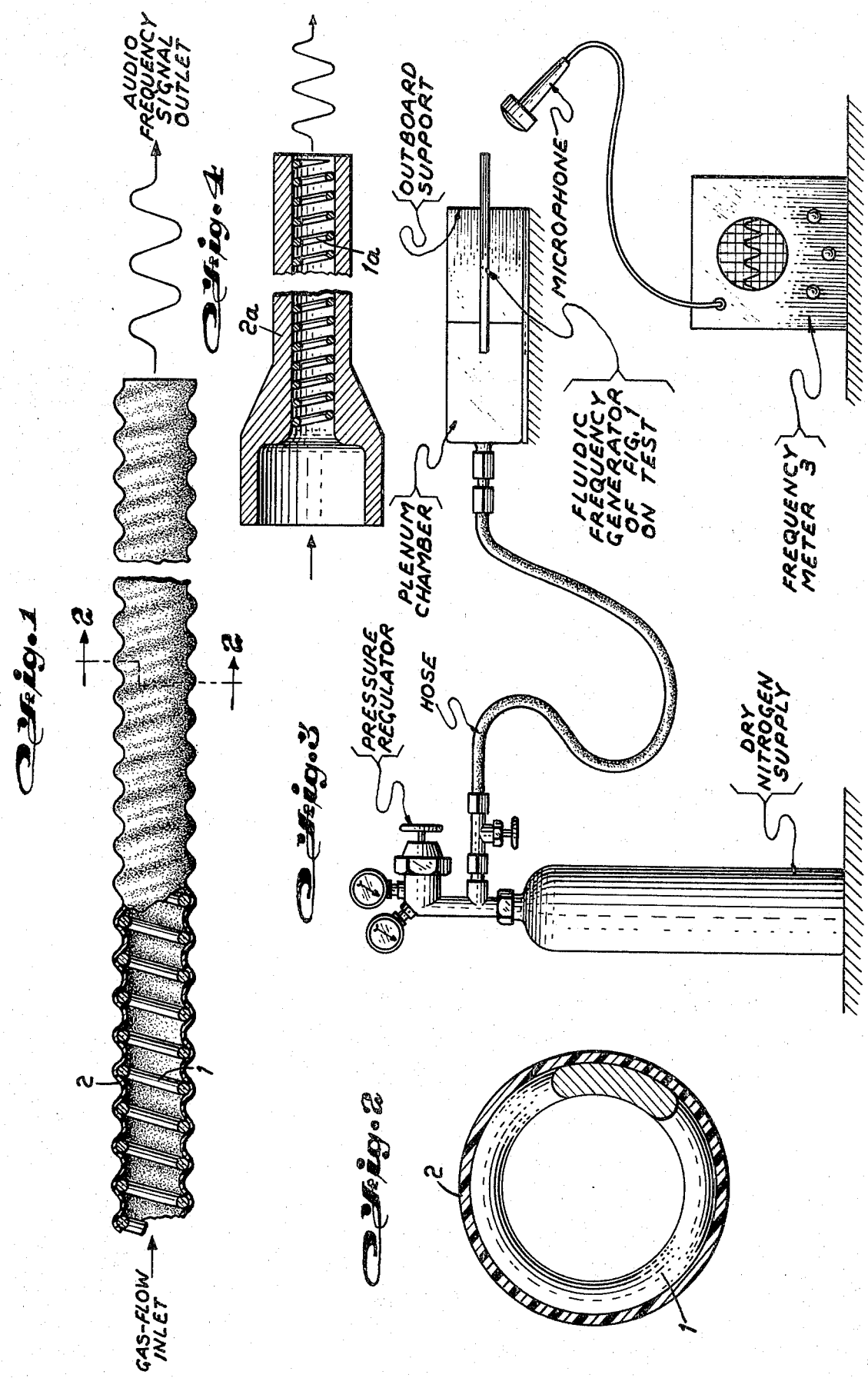

FLUIDIC FREQUENCY GENERATOR

BACKGROUND OF THE INVENTION

This invention relates to a fluidic frequency generator and more particularly to a fluidic frequency generator whose output frequency in cycles per second (cps) is proportional to the pressure in terms of pounds per square inch (psi) of a gas applied to the input thereof or to the changes in the mass rate of gas flow through the generator.

SUMMARY OF THE INVENTION

The object of the present invention is to provide a fluidic frequency generator whose output frequency is proportional to either of the above mentioned predetermined characteristics of gas flowing through the fluidic frequency generator.

A feature of the present invention is the provision of a fluidic frequency generator comprising: a helix of wire having predetermined dimensions; and a sleeve of selected material disposed to encircle and conform to the exterior surface configuration of the helix; the helix and the sleeve cooperating to provide at one end thereof an audio frequency in response to a gas applied to the other end thereof, the audio frequency being proportional to a predetermined characteristic of the gas flowing through the helix and the sleeve.

BRIEF DESCRIPTION OF THE DRAWING

Above-mentioned and other features and objects of this invention will become more apparent by reference to the following description taken in conjunction with the accompanying drawing, in which:

FIG. 1 is an elevational view partially in cross-section of a first embodiment of a fluidic frequency generator in accordance with the principles of the present invention;

FIG. 2 is a cross-sectional view taken along line 2—2 of FIG. 1;

FIG. 3 is a testing arrangement to enable determining the relationship between a predetermined characteristic of a gas applied to the input of and the frequency of the audio frequency signal output of the fluidic frequency generator of FIG. 1; and FIG. 4 is a longitudinal cross-sectional view of a second embodiment of a fluidic frequency generator in accordance with the principles of the present invention.

DESCRIPTION OF THE PREFERRED EMBODIMENTS

Referring to FIGS. 1 and 2, there is illustrated therein a first embodiment of a fluidic frequency generator in accordance with the principles of the present invention which includes a helix 1 of wire, such as music wire and a sleeve 2 of a selected material, such as plastic, encircling helix 1 and conforming to the exterior surface configuration of helix 1.

In a reduction to practice of fluidic frequency generator of FIG. 1 the length of the resulting tube is 10 inches long, the helix 1 is formed of music wire having a diameter of 0.075 inches and a pitch diameter of 0.370 inches with six turns per inch while the plastic sleeve 2 has a thickness of 0.010 inches and is shrunk over helix 1. The outer diameter of the combined helix and plastic sleeve has a dimension of 0.437 inches.

When the fluidic frequency generator was tested employing the arrangement of FIG. 3, the relationship between the output frequency with increasing input gas or air pressure was observed and are presented hereinbelow in Table I. The frequencies produced as indicated in Table I were observed on the frequency meter 3, such as an oscilloscope, to be fairly pure and occurred in stepped transitions as illustrated in Table I.

TABLE I

| PRESSURE in psi | OUTPUT FREQUENCY in cps | MULTIPLYING FACTOR |
|---|---|---|
| 0 | 1250 ——————→ | 1 |
| | 1680 | |
| | 2500 ——————→ | 2 |
| | 2850 | |
| | 3570 | |
| 20 | 5000 ——————→ | 4 |

The reason that the fluidic frequency generator of FIG. 1 produces the frequencies illustrated in Table I with increasing pressure of the input gas is believed to be due to the fact that a gas or air column vibrates sympathetically to set up stationary waves that have a frequency proportional to the pressure of the input gas.

Employing the fluidic frequency generator of FIG. 1 having the dimensions as set forth hereinabove wherein the length (L) is 10 inches or 0.835 feet the theory of vibration of air columns as applied to open tubes is applied to the fluidic frequency generator of FIG. 1 and the following information was obtained as indicated in Table II.

TABLE II

| | |
|---|---|
| Fundamental Wavelength: | $\lambda = 2/1\ L = 1.67$ ft. at $f_f$ |
| First Overtone | $\lambda = 2/2\ L = .835$ ft. at $f_1$ |
| Second Overtone | $\lambda = 2/3\ L = .566$ ft. at $f_2$ |
| Third Overtone | $\lambda = 2/4\ L = .417$ ft. at $f_3$ |
| Fourth Overtone | $\lambda = 2/5\ L = .334$ ft. at $f_4$ |
| Fifth Overtone | $\lambda = 2/6\ L = .278$ ft. at $f_5$ |
| Sixth Overtone | $\lambda = 2/7\ L = .239$ ft. at $f_6$ |
| Seventh Overtone | $\lambda = 2/8\ L = .209$ ft. at $f_7$ |

Accordingly, based upon $f = c/\lambda$, where $c$ is equal to the velocity of sound at room temperature and atmospheric pressure and is equal to 1090 ft./sec., there is obtained as shown in Table III the frequencies of vibration of each of the wavelengths presented in Table II.

TABLE III

| | |
|---|---|
| $f_f = 1090/1.67 = 652$ cps | $f_4 = 1090/.334 = 3260$ cps |
| $f_1 = 1090/.835 = 1305$ cps | $f_5 = 1090/.278 = 3920$ cps |
| $f_2 = 1090/.566 = 1930$ cps | $f_6 = 1090/.239 = 4560$ cps |
| $f_3 = 1090/.417 = 2610$ cps | $f_7 = 1090/.209 = 5200$ cps |

It has been determined experimentally that the frequencies in Table III are not quite correct since radiation from the open end of the open tube has been neglected. To take account of this, the length L in the formula of Table II must be slightly increased. If, for instance, a 5% correction were applied, the truer frequency for the open tube of 10 inches in length would be as shown below in Table IV.

TABLE IV

| THEORETICAL VALUES FOR OPEN TUBE | ACTUAL MEASURED VALUES OF GEN. OF FIG. 1 | VARIATION |
|---|---|---|
| $f_f = 620$ | | |
| $f_1 = 1245$ | $f_1 = 1250$ | <1% |
| $f_2 = 1830$ | $f_2 = 1680$ | 9% |
| $f_3 = 2480$ | $f_3 = 2500$ | <1% |
| $f_4 = 3100$ | $f_4 = 2850$ | 9% |
| $f_5 = 3730$ | $f_5 = 3750$ | <1% |
| $f_6 = 4350$ | $f_6 = ?$ | ? |
| $f_7 = 4950$ | $f_7 = 5000$ | <1% |

As can be seen from the above open tube analysis as found in Tables II–IV, there is a close correlation between the excitation of the open tube and that of the fluidic frequency generator of FIG. 1. It should be noted that a particular vibrating frequency is triggered and maintained by a particular mass rate of gas flow through the configuration disclosed in FIG. 1. Thus, it is possible to use the configuration of the fluidic frequency generator of FIG. 1 to monitor changes in the mass rate of gas flow through a tube.

The fluidic frequency generator of FIG. 1 will have utility as a gas pressure to frequency translator, a mass rate of gas flow to frequency translator, a gas logic circuit component and a monitoring device for the mass rate of gas flow in a tube.

Referring to FIG. 4, there is illustrated therein a second embodiment of a fluidic frequency generator in accordance with the principles of the present invention which includes a helix $1a$ of wire, such as music wire and a sleeve $2a$ of metal encircling helix $1a$. The operation of this embodiment is as described with respect to the first embodiment of FIGS. 1 and 2.

While I have described above the principles of my invention in connection with specific apparatus it is to be clearly understood that this description is made only by way of example and not as a limitation to the scope of my invention as set forth in the objects thereof and in the accompanying claims.

I claim:
1. A fluidic frequency generator comprising:
a helix of wire having predetermined dimensions;
a sleeve of selected material disposed to encircle and conform to the exterior surface configuration of said helix; and
means containing a pressurized gas having a pressure greater than the atmosphere, said means being coupled to one end of said helix and said sleeve to direct said pressurized gas for flow through said helix and said sleeve from said one end to the other end of said helix and said sleeve;
said helix and said sleeve cooperating to provide at said other end an audio frequency in response to said gas flowing through said helix and said sleeve, said audio frequency being proportional to a predetermined characteristic of said gas flowing through said helix and said sleeve.
2. A generator according to claim 1, wherein
said predetermined characteristic is the pressure of said gas.
3. A generator according to claim 1, wherein
said predetermined characteristic is the change in the mass rate of flow of said gas.
4. A generator according to claim 1, wherein
said selected material is a plastic material.
5. A generator according to claim 4, wherein
said predetermined characteristic is the pressure of said gas.
6. A generator according to claim 4, wherein
said predetermined characteristic is the change in the mass rate of flow of said gas.
7. A generator according to claim 1, wherein
said selected material is a metal.
8. A generator according to claim 7, wherein
said predetermined characteristic is the pressure of said gas.
9. A generator according to claim 7, wherein
said predetermined characteristic is the change in the mass rate of flow of said gas.

* * * * *